United States Patent [19]

Backhaus

[11] 4,201,487
[45] May 6, 1980

[54] DEVICE FOR MAKING SAUCES

[76] Inventor: Franz J. Backhaus, Altstrasse 8, 6450 am Main, Fed. Rep. of Germany

[21] Appl. No.: 3,050

[22] Filed: Jan. 12, 1979

[30] Foreign Application Priority Data

Jan. 14, 1978 [DE] Fed. Rep. of Germany ....... 2801549

[51] Int. Cl.² ........................... B01F 5/06; B01F 7/16
[52] U.S. Cl. .................................. 366/304; 366/306; 366/314; 366/159
[58] Field of Search ............... 366/303, 304, 305, 306, 366/176, 314, 159; 99/275, 348

[56] References Cited

U.S. PATENT DOCUMENTS

| | | | |
|---|---|---|---|
| 3,000,618 | 9/1961 | Oakes | 366/303 |
| 3,194,540 | 7/1965 | Hager | 366/305 |
| 3,744,763 | 7/1973 | Hildegard | 366/303 |
| 3,912,236 | 10/1973 | Zipperer et al. | 366/303 |
| 3,998,433 | 12/1976 | Iwako | 366/304 |

*Primary Examiner*—Robert W. Jenkins
*Attorney, Agent, or Firm*—Dennison, Dennison, Meserole & Pollack

[57] ABSTRACT

Apparatus for mixing and improving the quality of sauces including a mixing vessel supported on a housing, said housing having a funnel shaped inlet through which the ingredients pass. An annular rotor is rotatable with respect to a stator member, the sauce ingredients being acted on by the same to produce a smooth, improved product. A passageway provides repeat circulation of the mixture through the apparatus and a tap is provided to withdraw the completed sauce.

20 Claims, 3 Drawing Figures

DEVICE FOR MAKING SAUCES

The invention refers to a device for making sauces, like e.g. sauce hollandaise or sauce béarnaise, in a mixing vessel.

In order to make so-called traditional sauces, as for example delicate egg-butter-cream sauces such as sauce hollandaise or sauce béarnaise, no labor-saving devices are available to either the professional cook or to the housewife. Rather laborious work requiring great skill must be performed and great pains taken in order to produce the hot-whipped sauces. The sauces made by hand have a keeping quality of two to three hours so that one cannot make sauces at one time for midday and evening meals.

It is therefore the object of the present invention to provide for the first time a device for the making of emulsion-like sauces. By emulsion-like sauces I do not mean only the classic sauces, but also all other cream sauces, sauces for game with sour cream or any other thickenings. According to the invention this object is achieved in that the mixing vessel is connected with an upper part of a housing accommodating a rotor and a subsequent lower part of the housing having a stator, whereby the upper part of the housing has a funnel-shaped cross-section leading into the rotor area in axial alignment therewith. The rotor area is flush with the funnel-shaped portion and has a central part shaped like a truncated cone. Thereby the rotor and the stator co-operate with each other.

With a device having these components it is possible within the shortest time, approximately 60 seconds, to produce a liter of a warm-whipped sauce having a keeping quality of about eight days. As compared to the sauces whipped by hand, the mechanically treated sauces present an improvement of 200 to 300% as to combining capacity, consistency, heat absorption capacity, gratinating capacity, keeping quality and purity.

In a preferred embodiment the stator is formed of projections extending from the lower part of the housing to the upper part of the housing. The projections are arranged on an annulus and spaced at a regular distance from each other. The projections are configured with four sides having a plane upper free surface. The lateral faces are curved. Two of the lateral faces are configured concentrically to the annulus arrangement of the projections, and the other two are of concave configuration. Preferably the adjacent surfaces will form cutting edges.

The rotor likewise has projections surrounding the stator arranged annularly. In the middle of the rotor there is provided a central part of truncated cone shape, extending toward the mixing vessel that can be detached from the upper part of the housing. The projections of the rotor are configured similarly to those of the stator. The projections of the rotor are arranged on an annular disk being connected with the central part of truncated cone shape via a wall shaped like the surface of a cone and provided with openings. Through the holes in the wall which are preferably of circular configuration, the ingredients of the sauce or, respectively, the finished sauce, are "sucked" during operation into the space between rotor and stator. As already mentioned, the wall shaped like the surface of a cone, according to the invention is in alignment with the funnel-shaped portion of the upper part of the housing.

The upper part of the housing has a cylindrical shape to accommodate the rotor. The relief is provided with a protrusion to which there is connected a return system to the space above the stator or, respectively, an outlet for the device. Thereby circulation of the sauce ingredients or, respectively, the sauce through the rotor-stator space is made possible. In addition thereto, the protrusion is connected with an outlet in order to remove the sauce after its having run through the circulation several times.

The shaft actuating the rotor extends into the space of the mixing vessel being detachable from the upper part, and is provided with blades in order to mix the sauce ingredients put into the mixing vessel.

Further embodiments of the invention will be apparent hereinafter.

Other details, advantages and characteristics of the invention will be apparent upon consideration of the following detailed description in conjunction with the accompanying drawings wherein.

Figure 1:
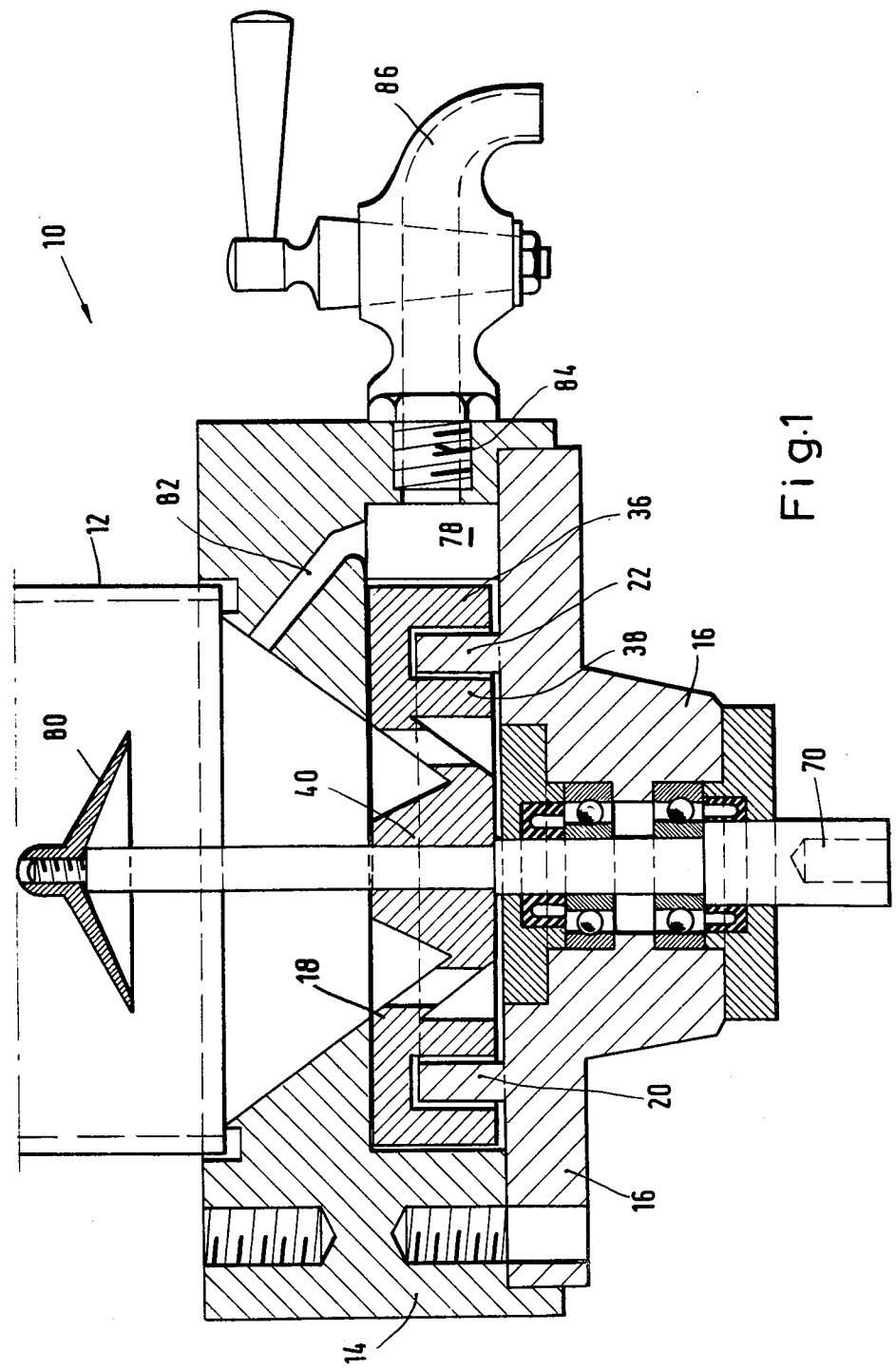
FIG. 1 is a vertical sectional view of the device.

FIG. 1 schematically shows a partial view of the device 10 according to the invention for the production of emulsion-like sauces. The device 10 consists of a mixing vessel 12 being detachably connected to an upper part of a housing 14. The upper part of the housing 14 is continued by a lower part of the housing 16 being joined with the upper part e.g. by means of screws.

Figure 2:
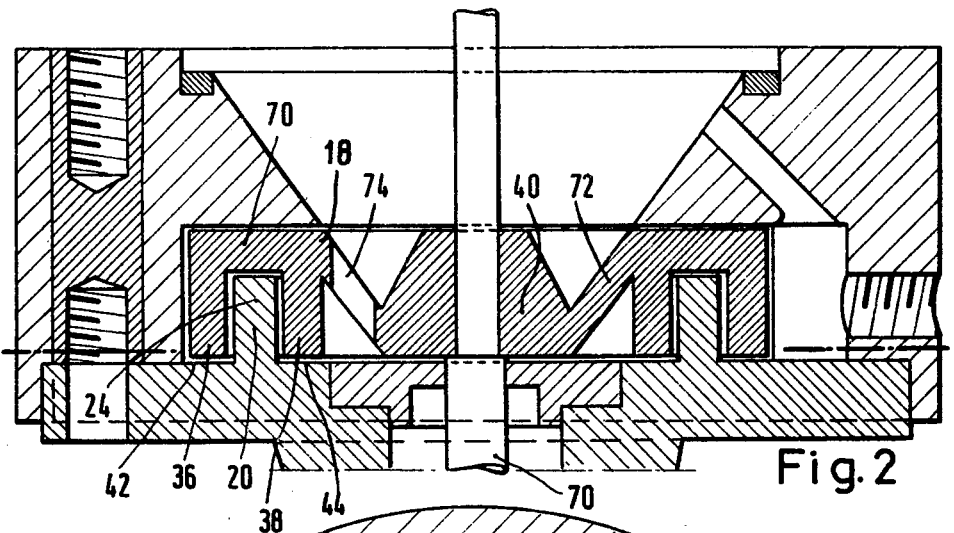
FIG. 2 is a sectional view of the rotor-stator area with surrounding parts of the housing of the device.
Figure 3:
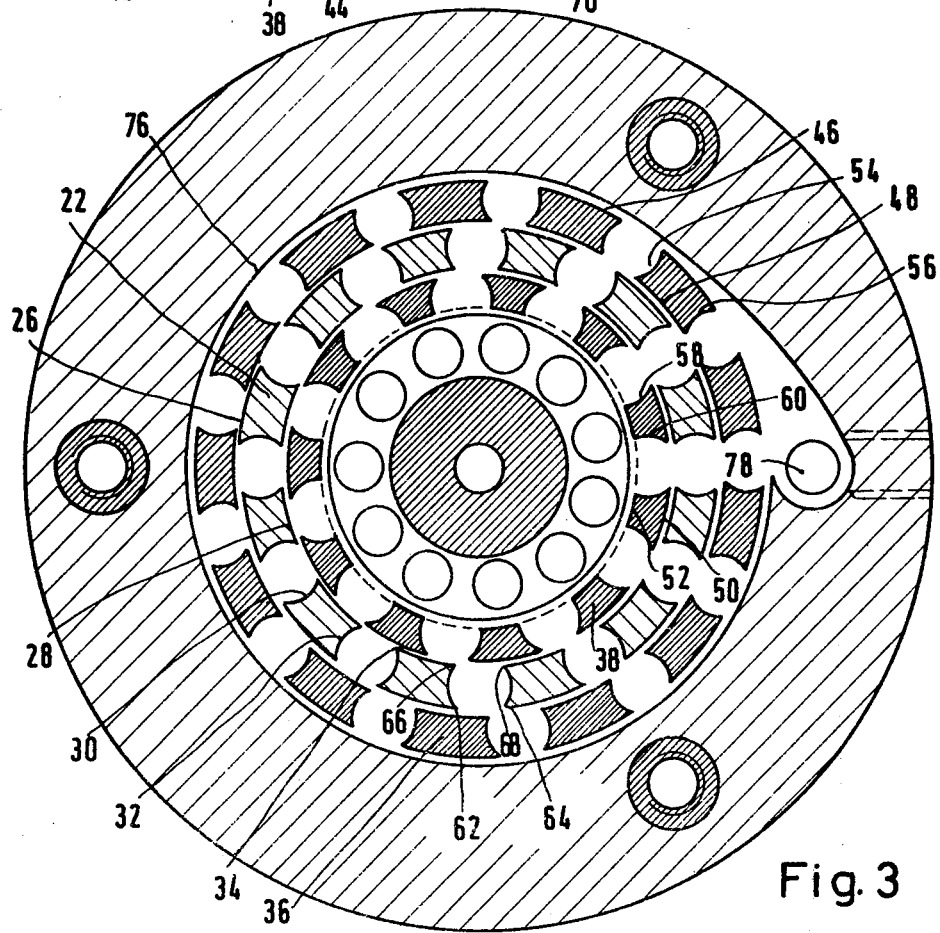
FIG. 3 is a horizontal sectional view of the device in the rotor-stator area.

Below the mixing vessel 12, the upper part of the housing 14 has a conical relief extending toward the lower part of the housing 16, into which, on the other hand, projects a central part 40 shaped like a truncated cone. This central part 40 of truncated cone shape is part of a rotor 18 shown in more detail in FIGS. 2 and 3, being actuated via a shaft 70 by a motor (not specificly shown) which is arranged below the lower part of the housing 16. The shaft 70 extends via the rotor into the area of the mixing vessel 12 and has blades 80 mounted on its upper end.

In addition to the conical central part 40, the rotor 18 is provided with projections 36 and 38 being arranged concentrically with respect to each other. The projections 36 and 38 of the rotor 18, in turn, surround projections 22 which together form a stator 20 arranged on the lower part of the housing 16. Like the projections 36 and 38 of the rotor, the projections of the stator are arranged on an annulus and at a regular spaced distance in respect to each other. The cross sections of the projections 22, 36, 38 are configured similarly, i.e. polygonal or four-sided. Two surfaces 26, 28 each of the projections 20 and, respectively 46, 48 of the projections 36 and surfaces 50, 52 of the projections 38 are configured concentrically to the annulus arrangement. The other lateral faces 30, 32 and, respectively 54, 56, and 58, 60 are concave. In addition thereto, the sectional edges 62, 64, 66 and 68 of the lateral faces serve as cutting edges.

The central part 40, shaped like a truncated cone, of the rotor 18, via a wall 72 shaped like the surface of a cone, is connected with that part of the rotor having the projections 36, 38. Thereby the projections 36, 38 are arranged on an annular disk. The wall 72 shaped like the surface of a cone has openings 74 serving to pass the sauce ingredients or, respectively the sauce from the range of the mixing vessel through the relief in the upper part of the housing 14 into the space between rotor 18 and stator 16. Preferably the wall 72 is configured in alignment to the wall limiting the conical relief in the upper part of the housing 14. Further the upper part of the housing has a cylindrical relief 76 serving to accommodate the rotor 18. The cylindrical relief 76 has a protrusion 78 in which a portion of the sauce can be collected that has passed the rotor-stator area. The protrusion 78, via a connection 82, is connected with the open area of the upper part of the housing of the mixing vessel or, respectively, via an outlet 84 with e.g. a faucet 86.

The operation of the device according to the invention is now as follows:

Through a feed opening egg yolks and reducing agents are put into the mixing vessel 12 (the feed opening is not shown). These ingredients are mixed by means of blades 80 arranged at the upper end of the shaft 70. Thereafter the mixture enters the conical area of the upper part of the housing 14 in order to reach the rotor-stator area through the holes 74 in the wall 72. By the speed of the rotor 18 centrifugal forces act upon the mixture so that it is drawn into the area between the rotor and stator to be subsequently collected in the protrusion 78. By the following mixture, the egg yolk-reduction mixture already collected in the protrusion 78, via the channel 82 is again passed into the free space above the rotor. Thus a circulation is established, whereby it will be noted that the mixture passes into the rotor-stator area not only by gravity but also by suction generated by the centrifugal forces. If one lets the egg yolk-reduction mixture for about 30 to 40 seconds run through the circulation formed by the rotor-stator-area, the protrusion 78, conduit 82, the free space of the upper part of the housing 14 and the rotor-stator range etc., then a homogeneous mixture is achieved to which warm melted butter, so-called purified butter, can be added in order to produce the finished emulsion-like sauce. After the entire mixture has been run through the above mentioned circulation several times, an emulsion is produced that can be removed through the faucet 86 of the device.

In order to make about a liter of sauce bearnaise, one needs therefore an operating time of the machine of approximately 1 minute. As compared to a sauce whipped up by hand, the time required therefor is a multiple of the time required with the device according to the invention.

After use, once a sauce has been finished, one merely has to fill the mixing vessel with clear water which by the rotation of the rotor will likewise run through the above mentioned circulation of the machine and thus effect a cleaning of the same.

I claim:

1. Apparatus for making and mixing sauces comprising a housing, an open-bottom mixing vessel having its open bottom seated on said housing, a stator assembly fixedly mounted in the lower part of said housing, a rotor assembly adapted for rotation within said housing and located centrally therein, and a funnel-shaped opening in the upper part of said housing and in axial alignment with said rotor assembly, said rotor assembly comprising a plurality of circumferentially spaced projections extending downwardly toward the lower part of said housing, the central portion of the rotor assembly being formed as an upstanding truncated cone extending into the funnel-shaped opening, said rotor projections extending from an annular disk member, and a conical wall connecting the base of the truncated cone to said disk.

2. Apparatus as defined in claim 1 wherein said conical wall is a continuation of the surface of said funnel-shaped opening in the upper part of said housing.

3. Apparatus as defined in claim 2, wherein said conical wall is provided with a plurality of openings whereby sauce ingredients placed in said mixing vessel can pass into the rotor-stator area.

4. Apparatus as defined in claim 3, wherein said openings are circular and are regularly spaced from each other about the entire surface of the conical wall.

5. Apparatus as defined in claim 1 wherein the stator assembly comprises a plurality of circumferentially spaced projections extending upwardly from the lower part of said housing.

6. Apparatus for making and mixing sauces comprising a housing, an open-bottom mixing vessel having its open bottom seated on said housing, a stator assembly fixedly mounted in the lower part of said housing, a rotor assembly adapted for rotation within said housing and located centrally therein, and a funnel-shaped opening in the upper part of said housing and in axial alignment with said rotor assembly, the upper part of said housing being provided with a collection space radially spaced from said rotor, and a channel interconnecting said space with said funnel-shaped opening in said housing to establish a loop circulation for the sauce to be produced.

7. Apparatus as defined in claim 6 and further including a sauce outlet connected to said collection space.

8. Apparatus for making and mixing sauces comprising a housing having a mixing vessel assembly directly associated therewith, a combined fixed stator assembly and cooperating rotatable rotor assembly within said housing and directly communicating with said mixing vessel assembly, a collection space within said housing in spaced communication with said stator and rotor assemblies, and channel means interconnecting said collection space and said mixing vessel assembly in said housing to establish a loop circulation for the sauce to be produced.

9. Apparatus as defined in claim 8 including a sauce outlet communicated with said collection space.

10. Apparatus as defined in claim 8 wherein said rotor assembly includes a central portion formed as an upstanding truncated cone extending into said mixing vessel assembly, said rotor assembly further including a conical wall surrounding said truncated cone central portion and projecting outwardly from one end thereof.

11. Apparatus as defined in claim 10 wherein the conical wall of said rotor assembly terminates in an annular disc remote from said truncated cone, said rotor assembly projections depending from said annular disc.

12. Apparatus as defined in claim 11 including openings through said conical wall for the passage of sauce ingredients therethrough.

13. Apparatus as defined in claim 8 wherein the stator assembly comprises a plurality of annularly spaced projections extending toward the rotor assembly, said projections being four-sided and having plain outer surfaces and curved lateral faces.

14. Apparatus as defined in claim 13 wherein two of the lateral faces of each projection generally parallel the annular arrangement of the projections.

15. Apparatus as defined in claim 14 wherein the remaining faces of each projection are of concave configuration.

16. Apparatus as defined in claims 13 or 15 wherein the edges of each projection form sharp cutting portions.

17. Apparatus as defined in claim 13 wherein said rotor assembly comprises a plurality of annularly spaced projections extending toward said stator assembly, said rotor assembly projections being four-sided and having plain outer surfaces and curved lateral faces.

18. Apparatus as defined in claim 17 wherein two of the lateral faces of each rotor assembly projection generally parallel the annular arrangement of the rotor assembly projections.

19. Apparatus as defined in claim 18 wherein the remainder of the rotor assembly lateral faces are of concave configuration.

20. Apparatus as defined in claim 17 wherein the rotor assembly projections are formed in two radially spaced rows on either side of the stator assembly projections, the length of the faces of the rotor assembly projections facing the corresponding faces on the stator assembly projections being at least equal to the length of these stator assembly faces.

* * * * *